United States Patent
Leque et al.

(10) Patent No.: US 11,248,532 B2
(45) Date of Patent: Feb. 15, 2022

(54) HYBRID ELECTRIC DUAL SPOOL POWER EXTRACTION GEARBOX

(71) Applicant: United Technologies Corporation, Farmington, CT (US)

(72) Inventors: Nicholas D. Leque, Vernon, CT (US); Joseph H. Polly, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 218 days.

(21) Appl. No.: 16/751,287

(22) Filed: Jan. 24, 2020

(65) Prior Publication Data

US 2020/0248632 A1 Aug. 6, 2020

Related U.S. Application Data

(60) Provisional application No. 62/801,722, filed on Feb. 6, 2019.

(51) Int. Cl.
| | |
|---|---|
| *F02C 7/36* | (2006.01) |
| *F01D 17/24* | (2006.01) |
| *F02C 7/268* | (2006.01) |
| *F16H 1/36* | (2006.01) |
| *F16H 57/08* | (2006.01) |

(52) U.S. Cl.
CPC .............. *F02C 7/36* (2013.01); *F01D 17/24* (2013.01); *F02C 7/268* (2013.01); *F16H 1/36* (2013.01); *F16H 57/08* (2013.01); *F05D 2220/32* (2013.01); *F05D 2240/60* (2013.01)

(58) Field of Classification Search
CPC .... F02C 7/36; F02C 7/268; F02C 7/32; F02C 9/56; F01D 17/24; F01D 17/22; F01D 19/00; F16H 1/36; F16H 57/08; F05D 2220/32; F05D 2240/60
See application file for complete search history.

(56) References Cited

U.S. PATENT DOCUMENTS

| | | | | |
|---|---|---|---|---|
| 2006/0272313 | A1* | 12/2006 | Eick | F02C 3/107 60/39.63 |
| 2007/0151258 | A1* | 7/2007 | Gaines | F02K 3/06 60/792 |

(Continued)

FOREIGN PATENT DOCUMENTS

EP  2617965 A2  7/2013

OTHER PUBLICATIONS

European Search Report for European Application No. 20155952.3 dated Jul. 15, 2020.

*Primary Examiner* — Igor Kershteyn
*Assistant Examiner* — Joshua R Beebe
(74) *Attorney, Agent, or Firm* — Carlson, Gaskey & Olds, P.C.

(57) ABSTRACT

A turbofan engine includes a first spool including a first turbine and a second spool including a second turbine. A superposition gear system includes a plurality of intermediate gears engaged to a sun gear and supported in a carrier and a ring gear circumscribing the intermediate gears. A second tower shaft is engaged to drive the sun gear. A starter is selectively coupled to the sun gear through a starter clutch. A first electric motor and a second electric motor are coupled to the superposition gear system and are operable to input power into a corresponding one of the first and second spools.

26 Claims, 6 Drawing Sheets

(56) References Cited

U.S. PATENT DOCUMENTS

| | | |
|---|---|---|
| 2009/0007569 A1* | 1/2009 | Lemmers, Jr ............. F02C 7/36 60/792 |
| 2018/0045119 A1 | 2/2018 | Sheridan et al. |
| 2018/0149091 A1* | 5/2018 | Howell ................. F16H 37/065 |
| 2018/0202366 A1 | 7/2018 | Suciu et al. |
| 2018/0216526 A1 | 8/2018 | Dalal et al. |

* cited by examiner

HYBRID ELECTRIC DUAL SPOOL POWER EXTRACTION GEARBOX

CROSS-REFERENCE TO RELATED APPLICATIONS

This application claims priority to U.S. Provisional Application No. 62/801,722 filed Feb. 6, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Increasing amounts of power for aircraft accessory items are extracted from the turbine engine. Engine architectures include a single tower shaft coupled to a high speed spool of the engine. The tower shaft is used to start the engine and also to extract power during engine operation. Increasing loads on the single spool of the engine can limit potential engine performance capabilities.

Turbine engine manufacturers continue to seek further improvements to engine performance including improvements to thermal, transfer and propulsive efficiencies.

SUMMARY

A turbofan engine according to an exemplary embodiment of this disclosure includes, among other possible things, a first spool including a first turbine, a second spool including a second turbine disposed axially forward of the first turbine, a first tower shaft engaged to the first spool, a second tower shaft engaged to the second spool, and an accessory gearbox supporting a plurality of accessory components. A superposition gear system is disposed within the accessory gearbox, and the superposition gear system includes, a plurality of intermediate gears engaged to the sun gear and supported in a carrier and a ring gear circumscribing the intermediate gears. The second tower shaft is engaged to drive the sun gear. A starter is selectively coupled to the sun gear through a starter clutch. A first electric motor is selectively coupled to the ring gear through a first motor clutch. A second electric motor is selectively coupled to the sun gear through a second motor clutch. The first electric motor and the second electric motor are operable to input power into a corresponding one of the first and second spools.

In a further embodiment of the foregoing turbofan engine, an electric power supply provides power to the first electric motor and the second electric motor.

In another embodiment of any of the foregoing turbofan engines, a first ring gear clutch is included to selectively couple the first tower shaft to the ring gear. A second ring gear clutch is included to selectively couple the ring gear to a static structure of the engine In another embodiment of any of the foregoing turbofan engines, a carrier shaft is coupled to drive a first gear system within the accessory gearbox for driving a first group of the plurality of accessory components.

In another embodiment of any of the foregoing turbofan engines, a sun gear shaft supports the sun gear. The sun gear shaft couples the second tower shaft to the starter through the starter clutch.

In another embodiment of any of the foregoing turbofan engines, a ring gear shaft is driven by the first tower shaft. The ring gear is coupled to drive a second group of the plurality of accessory components.

In another embodiment of any of the foregoing turbofan engines, a drive gear is coupled to the sun gear shaft to drive a third group of the plurality of accessory components.

In another embodiment of any of the foregoing turbofan engines, the first turbine comprises a low pressure turbine and the second turbine comprises a high pressure turbine.

In another embodiment of any of the foregoing turbofan engines, the first tower shaft and the second tower shaft are concentric about a common axis.

In another embodiment of any of the foregoing turbofan engines, the first tower shaft and the second tower shaft are disposed about different axes.

In another embodiment of any of the foregoing turbofan engines, the starter clutch, first motor clutch, second motor clutch, first ring gear clutch and the second ring gear clutch comprise one-way mechanical clutches.

In another embodiment of any of the foregoing turbofan engines, the first motor clutch couples the first electric motor to the first tower shaft to drive the first spool. The second motor clutch couples the second electric motor to the second tower shaft to drive the second spool in an engine idle operating condition.

In another embodiment of any of the foregoing turbofan engines, the first motor clutch and the second motor clutch are not coupled during a normal operating condition such that neither the first electric motor nor the second electric motor input power to either of the first spool and the second spool.

In another embodiment of any of the foregoing turbofan engines, the second clutch couples the second electric motor to the second tower shaft to drive the second spool in an engine starting operating condition.

An accessory gearbox for a turbofan engine, according to an exemplary embodiment of this disclosure, includes, among other possible things, a superposition gear system including a sun gear coupled to a second tower shaft of the turbofan engine, a plurality of intermediate gears engaged to the sun gear and supported in a carrier, a ring gear circumscribing the intermediate gears and coupled to a first tower shaft, a starter selectively coupled to the sun gear through a starter clutch. A first output is coupled to the carrier shaft for driving a first group of accessory components. A second output is coupled to the first tower shaft for driving a second group of accessory components. A first motor means is coupled to the ring gear. A second motor means is coupled to the sun gear. The first motor means and the second motor means are operable to input power into a corresponding one of the first and second tower shafts.

In a further embodiment of the foregoing accessory gearbox for a turbofan engine, the first output comprises a carrier shaft attached to the carrier that is coupled to a first gear system driving the first group of accessory components.

In a further embodiment of any of the foregoing accessory gearboxes for a turbofan engine, the second output comprises a ring gear shaft driven by the first tower shaft that is coupled to a second gear system for driving the second group of accessory components.

In a further embodiment of any of the foregoing accessory gearboxes for a turbofan engine, each of the first motor means and second motor means comprise electric motors that are powered by an electric power supply.

In a further embodiment of any of the foregoing accessory gearboxes for a turbofan engine, a first motor clutch couples the first electric motor to the first tower shaft to drive a first spool. A second motor clutch couples the second electric motor to drive the second tower shaft in an engine idle operating condition.

In a further embodiment of any of the foregoing accessory gearboxes for a turbofan engine, the second clutch couples the second electric motor to the second tower shaft to drive a second spool in an engine starting operating condition.

In a further embodiment of any of the foregoing accessory gearboxes for a turbofan engine, each of the first motor means and second motor means comprise electric motor/generators that are powered by an electric power supply.

A method of operating an accessory gearbox for a turbofan engine according to an exemplary embodiment of this disclosure includes, among other possible things, coupling a first tower shaft to engage a first spool, coupling a second tower shaft to engage a second spool, and coupling a sun gear of a superposition gear system supported within the accessory gearbox to the second tower shaft. The superposition gear system includes the sun gear, a plurality of intermediate gears engaged to the sun gear and supported in a carrier and a ring gear circumscribing the intermediate gears. A first electric motor is coupled to the first tower shaft to input power to the first spool. A second electric motor is coupled to the second tower shaft to input power to the second spool during an engine idle operating condition.

In a further embodiment of the foregoing method of operating an accessory gearbox for a turbofan engine, a starter is coupled to the sun gear, the ring gear is coupled to an engine static structure. The second electric motor is coupled to the second tower shaft and driving the second spool with the starter and the second electric motor to rotate the second spool and start the turbofan engine.

In a further embodiment of any of the foregoing methods of operating an accessory gearbox for a turbofan engine, each of the first electric motor and the second electric motor are decoupled such that neither the first electric motor nor the second electric motor input power to either of the first spool nor the second spool. The first tower shaft drives the ring gear. The second tower shaft drives the sun gear once both the first spool and the second spool are rotating independent of rotation of the starter such that both the first tower shaft and the second tower shaft combine to drive a first output coupled to the carrier and a second output coupled to the ring gear.

In a further embodiment of any of the foregoing methods of operating an accessory gearbox for a turbofan engine, a first output of the superposition gear system drives a first group of accessory components at a first speed, and a second output of the superposition gear system drives a second group of accessory components at a second speed different than the first speed.

In a further embodiment of any of the foregoing methods of operating an accessory gearbox for a turbofan engine, a third output coupled to sun gear drives a third group of accessory components at a third speed that is different that both the first speed and the second speed.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
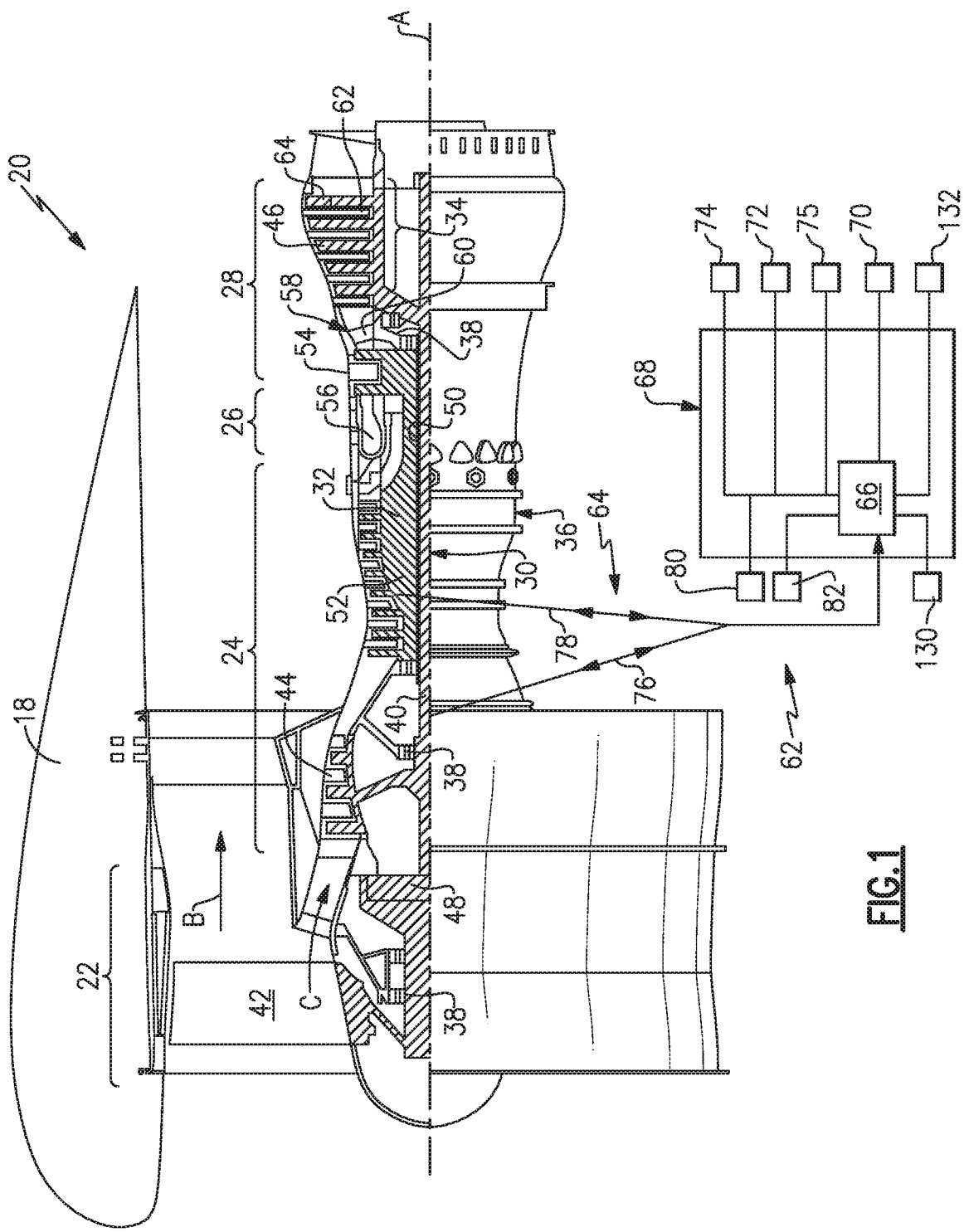
FIG. 1 is a schematic view of an example gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/ second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and, therefore, the relationship between the number of turbine rotors 34 in the low pressure turbine 46 and the number of blades 42 in the fan section 22 disclose an example gas turbine engine 20 with increased power transfer efficiency.

The example engine 20 includes an accessory drive system 62 that receives power from both the high speed spool 32 and the low speed spool 30. The accessory drive system 62 includes an accessory gearbox 68 for driving a plurality of accessory components 72, 74, 75, 80, and 82. The accessory components 72, 74, 75, 80, and 82 support operation of the gas turbine engine 20 and include pumps, generators and other devices driven to enable operation of different engine and aircraft systems. The accessory gearbox 68 is also coupled to a starter 70. The starter 70 is capable of driving the accessory drive system 62 to start the engine 20. In this example, a tower shaft assembly 64 including first and second tower shafts 76, 78 is coupled to both the low speed spool 30 and the high speed spool 32 to distribute and extract power between the two spools 30, 32.

A first electric motor 130 and a second electric motor 132 are coupled through the drive system 62 to input power into the engine and aid in driving the accessory components 72, 74, 75, 80, and 82. Excessive power extraction from a single spool, such as the high speed spool 32, can limit operation and degrade overall performance and engine efficiency. Accordingly, the example accessory drive system 62 extracts power from both the low speed spool 30 and the high speed spool 32 to meet the overall power demands of the engine 20 and the aircraft associated with the engine. The power extracted from the spools 30, 32 is combined in a superposition gear system 66 disposed within the accessory gearbox 68. Moreover, the first and second electric motors 130, 132 input power to the accessory gearbox 68 to reduce the load on the low and high speed spools 30, 32 of the engine.

Figure 2:
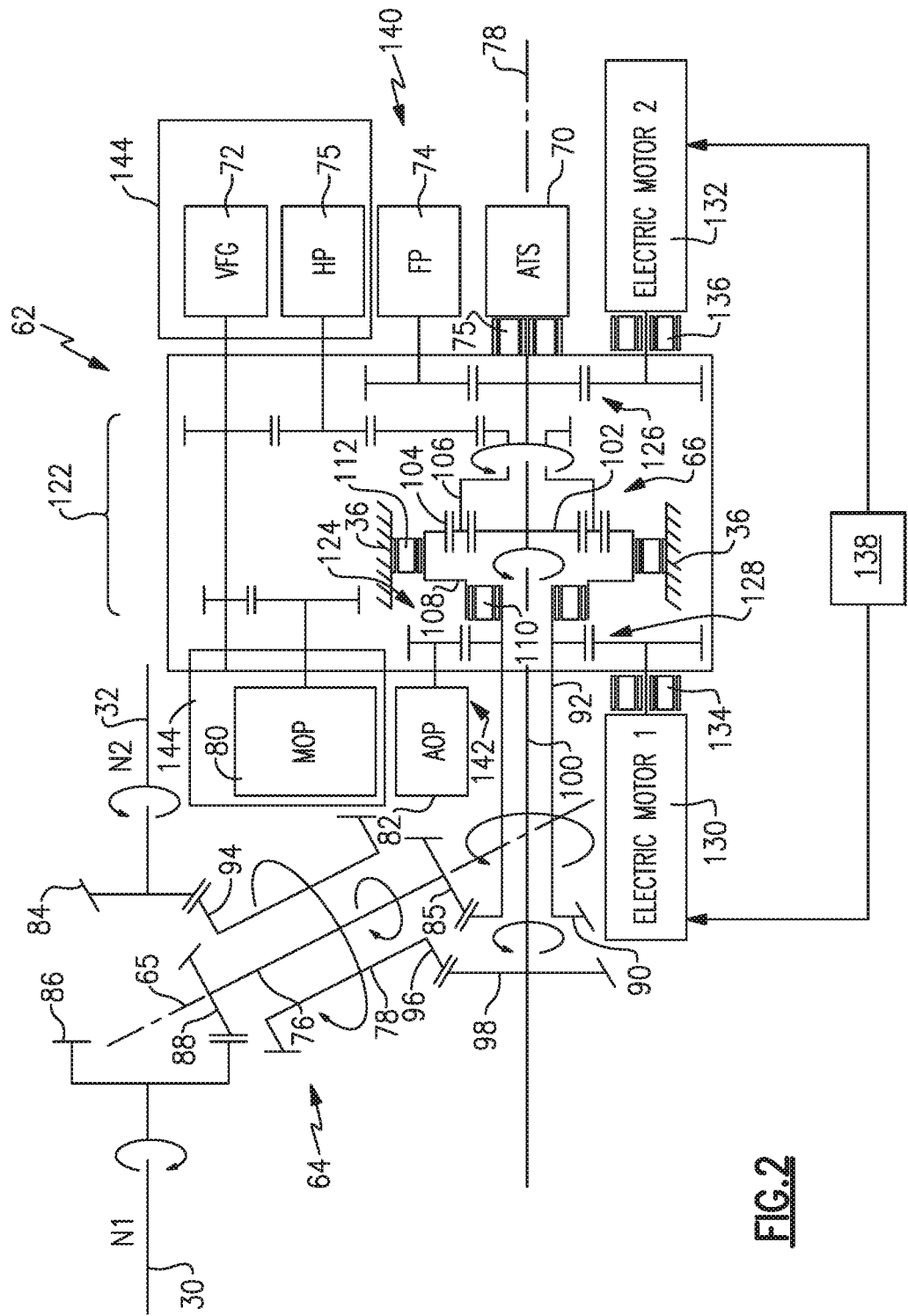
FIG. 2 is an example an example dual spool power extraction gearbox embodiment.

Referring to FIG. 2, with continued reference to FIG. 1, the superposition gear system 66 is an epicyclic gearbox that includes a sun gear 102 that rotates about an axis 78. A plurality of intermediate gears 104 are engaged with the sun gear 102 and supported by a carrier 106. A ring gear 108 circumscribes and engages the plurality of intermediate gears 104.

In the disclosed example, the tower shaft assembly 64 includes the first tower shaft 76 that is driven by a gear 86 disposed on the low speed spool 30. A first gear 88 on the tower shaft 76 is coupled to the gear 86. A second gear 85 is disposed on a second end of the tower shaft 76 and engages a drive gear 90 disposed on a ring gear shaft 92.

A second tower shaft 78 is coupled to a drive gear 84 that is driven by the high speed spool 32. The second tower shaft 78 includes a first gear 94 driven by the gear 84 on the high speed spool 32. A second gear 96 of the second tower shaft 78 is engaged to drive gear 98 disposed on a sun gear shaft 100.

In this example, the first tower shaft 76 and the second tower shaft 78 are disposed concentrically about a common axis 65. Moreover, the axis 65 is disposed at an angle relative to the engine longitudinal axis A and an axis 78 of the superposition gear system 66. It should be appreciated that although the specific disclosed embodiment includes concentric tower shafts 76, 78, other configurations and orientations of tower shafts are within the contemplation and scope of this disclosure.

First tower shaft 76 is coupled to the ring gear shaft 92 that is selectively coupled to the ring gear 108 through a first ring gear clutch 110. The second tower shaft 78 is coupled to the sun gear shaft 100 that is coupled to drive the sun gear 102. The sun gear shaft 100 directly couples to the sun gear 102 and extends past the sun gear 102 to the starter 70.

The superposition gear system 66, therefore, has a first input provided by the first tower shaft 76 through the ring gear shaft 92 to drive the ring gear 108 and a second input provided by the second tower shaft 78 to drive the sun gear shaft 100 and, thereby, the sun gear 102.

A first output from the superposition gear system 66 is provided by the carrier 106. The carrier 106 drives an accessory group 144 in the disclosed example embodiment. The ring gear shaft 92 provides a second output to drive the accessory group 142. Another accessory group 140 is driven by the sun gear shaft 100.

The sun gear shaft 100 provides both another input into the gear system 66 by being driven by the starter 70 and the third output to drive the accessory group 140. In this example embodiment, the accessory group 140 includes the fuel pump 74. However, other components could be driven from the sun gear shaft 100. The starter 70 provides a driving input to the sun gear 102 through the sun gear shaft 100.

The example superposition gear system 66 includes a direct connection between the starter 70 and the sun gear shaft 100 to provide for direct driving of the high speed spool 32. The sun gear shaft 100 is coupled to the starter 70 through a starter clutch 75. The starter clutch 75 in this example is a mechanical one-way clutch that enables direct driving of the high speed spool 32 during starting operations. Once the high speed spool 32 is operating, the starter clutch 75 prevents back driving or over driving of the starter 70. The sun gear shaft 100 is directly connected to the starter rather than being driven through a gear system. The direct drive of the high speed spool 32 through the direct connection simplifies operation and the mechanical connections.

The example superposition gear system 66 provides the first output through the carrier 106 that drives the accessory group 144 through a first gear system 122. In this example the first group of accessory components 72, 75, and 80 are driven at a first speed. Once the engine is started, the first output through the carrier 106 provides the driving input required to power the accessory components 72, 75 and 80 through the first gear system 122.

The accessory group 142 is driven by the ring gear shaft 92 through a second gear system 124. In this example, only one accessory component 82 is shown as being driven by the second gear system 124, however, other components could be included.

The accessory group 140 is driven by a gear 126 coupled to the sun gear shaft 100. The gear 126 is operable to rotate at the speed of the sun gear shaft 100 during engine operation and when driven by the starter 70 during starting operations.

The superposition gear system 66 includes a first ring gear clutch 110 that couples the ring gear shaft 92 to the ring gear 108. A second ring gear clutch 112 couples the ring gear 108 to a static engine structure 36. In this example, both the first ring gear clutch 110 and the second ring gear clutch 112 are mechanical one-way clutches. Moreover, in this example, the first and second mechanical one-way clutches 110, 112 are sprag clutches. It should be appreciated that although sprag clutches are disclosed by way of example, other mechanical clutch systems could be utilized and are within the contemplation of this disclosure.

The second ring gear clutch 112 couples the ring gear 108 to the engine static structure 36 during a starting operation to prevent rotation of the ring gear 108 and thereby the first tower shaft 76 and the low speed spool 30. When the ring gear 108 is fixed, the starter 70 will drive the sun gear shaft 100 such that it will be the only driving output back to the high speed spool 32.

Power extracted from the low and high speed spools 30, 32 can reduce engine efficiency. Power extraction for the spools 30, 32 may not meet the capacity required by the engine and aircraft without degrading engine performance and efficiency. Accordingly, the first and second electric motors 130, 132 are coupled through the superposition gearbox 62 to input power to the corresponding spools 30, 32. The first electric motor 130 is selectively coupled to the first tower shaft 76 by a coupling to the ring gear shaft 92 provided by a first motor clutch 134. The second electric motor 132 is selectively coupled to the second tower shaft 78 through the sun gear shaft 100 provided by a second motor clutch 136. The electric motors 130, 132 are powered by an electrical power source 138 provided on-board the aircraft or by a connection to a ground power system when the aircraft is on the ground. The electric motors 130, 132 are operable to input power into the superposition gearbox 66 to reduce loads on the spools 30, 32 during specific engine operating conditions. Moreover, in another exemplary embodiment, the electric motors may operate as motor/generators. When motor/generators are utilized, the clutches 134, 136 may not be required. Additionally, although electric motors are disclosed by way of example, any drive means could be utilized to input power through the superposition gearbox 66.

Figure 3:
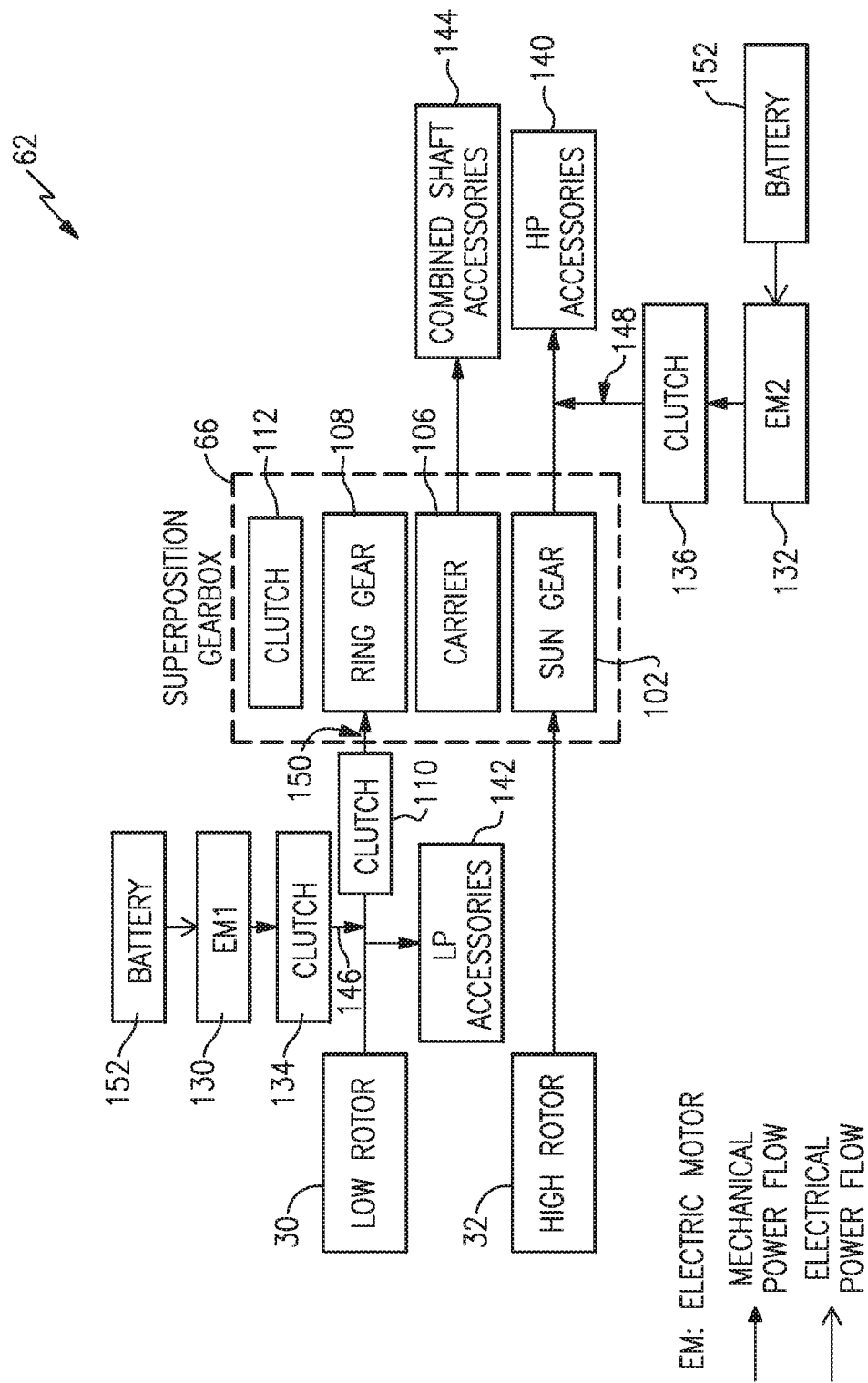
FIG. 3 is a schematic view of the example dual spool power extraction gearbox configured to input power during an engine idle operating condition.

Referring to FIG. 3 with continued reference to FIG. 2, a schematic power flow diagram is shown for the system 62 for an idle engine operating condition. An engine idling with the aircraft on the ground is inefficient as much of the power is extracted for operation of aircraft accessory items. The engine is therefore required to operate at increased power settings.

The disclosed system 62 engages the motors 130, 132 to the superposition gearbox 66 to drive the accessory items and reduce the load on the engine spools 30, 32. In the disclosed example, mechanical power flow is schematically indicated by arrows between the structural features. Accordingly, mechanical power is input from both the low and high spools 30, 32 into the superposition gearbox 66. The first and second electric motors 130, 132 are coupled by corresponding clutches 134 and 136 to supplement the mechanical power from the spools 30, 32. The first motor clutch 134 is coupled to the low speed spool 30 through a mechanical coupling schematically indicated at 146. The second electric motor 132 is coupled to the high speed spool 32 through a mechanical coupling indicated at 148 between the second motor clutch 136 and the sun gear shaft 100. The power input into the superposition gearbox 66 from the first and second electric motors 130, 132 reduces the load on the spools 30, 32 to enable more efficient engine operation at the idle condition.

In this example, the power for the first and second electric motors 130, 132 is provided by a battery system schematically indicated at 152. The battery system 152 can be within the aircraft or as part of a ground system providing power to the aircraft.

Figure 4:
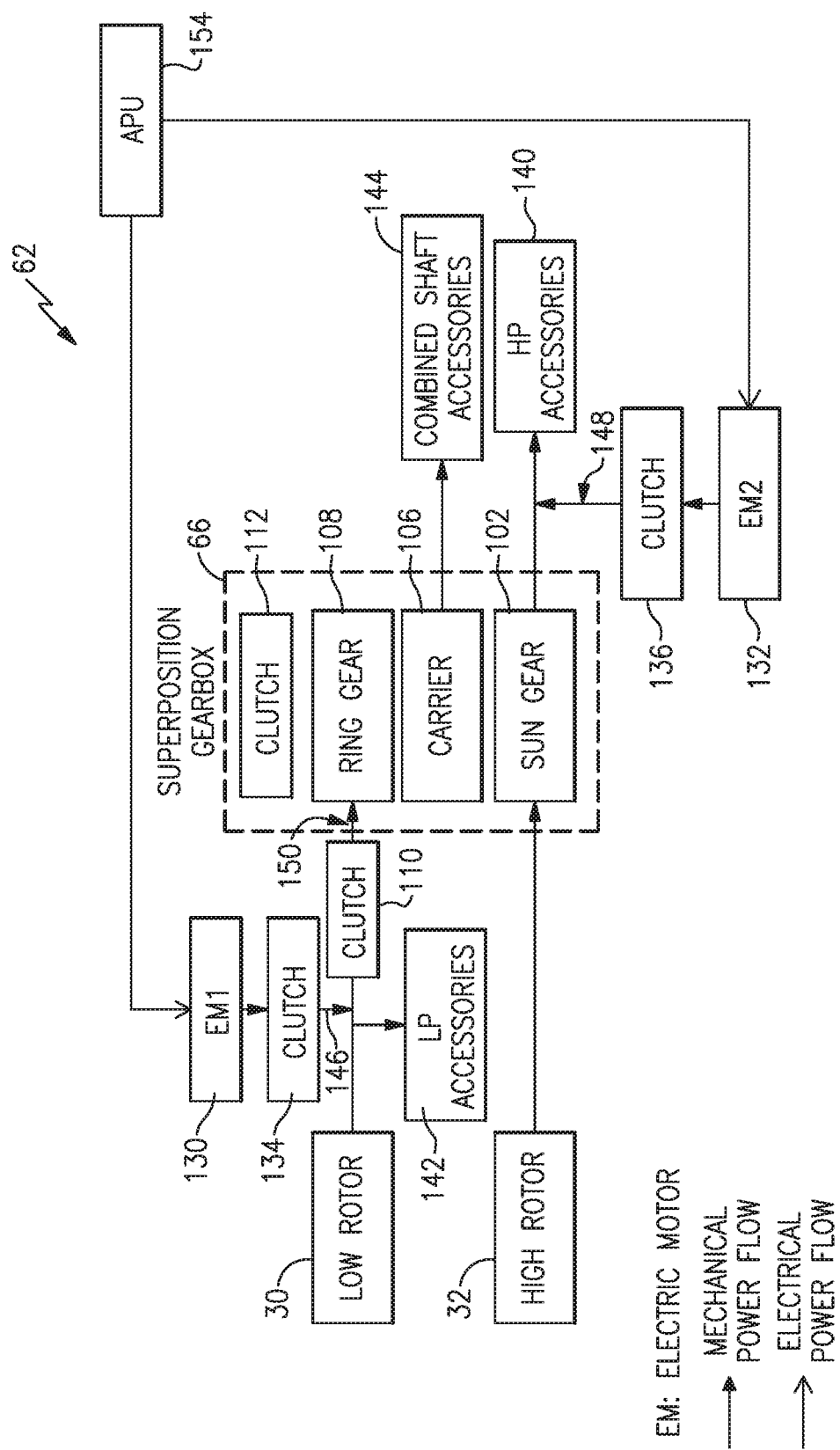
FIG. 4 is another schematic view of the example dual spool power extraction gearbox configured to input power during an engine idle operating condition.

Referring to FIG. 4, with continued reference to FIGS. 2 and 3, an alternate power source in the form of an auxiliary power unit (APU) 154 could also be utilized to power the electric motors 130, 132. The battery system 152 and the APU 154 are power sources that are separate from the system 62 such that the spools 30, 32 do not incur additional loads for power generation to drive the motors 130, 132. Instead, the example disclosed embodiment provides power for driving the motors 130, 132 from a source separate from the engine 20. However, power from the engine could be utilized in some engine operating conditions and is within the scope and contemplation of this disclosure.

Figure 5:
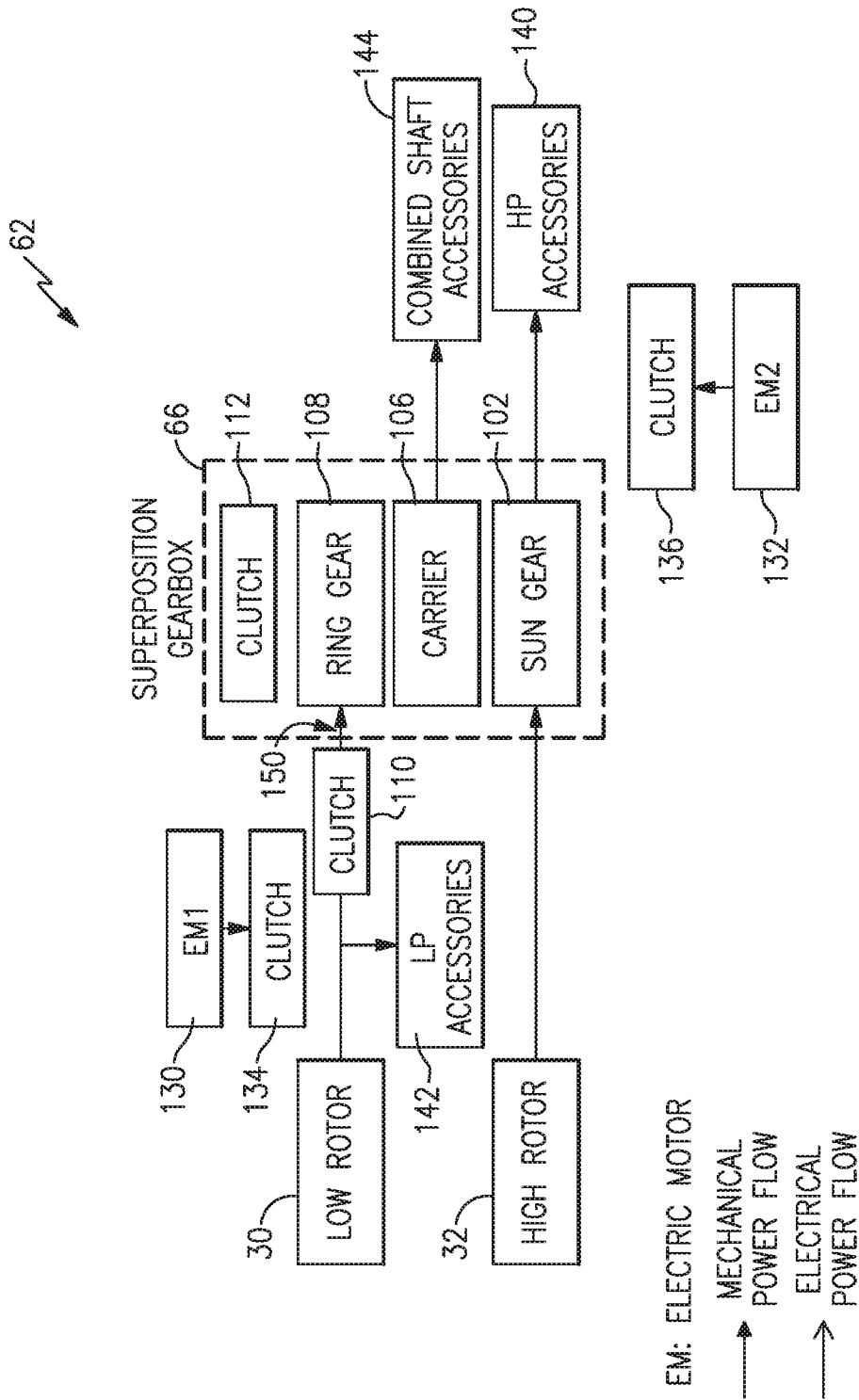
FIG. 5 is a schematic view of the example dual spool power extraction gearbox during an operating condition not including power input.

Referring to FIG. 5, with continued reference to FIG. 2, the example system 62 is shown in a condition where the engine is operating at cruise or other efficient engine operating conditions. At cruise or other operating conditions, the engine is operating at or near designed conditions and additional power from the motors 130,132 is not required. Accordingly, the first and second mechanical clutches 134, 136 are not engaged. In this example, the clutches 134, 136 are one-way mechanical clutches that prevent back driving of the motors 130, 132 by the spools 30, 32. Moreover, at engine operating conditions where the spools 30, 32 are rotating at increased speeds, the clutches prevent overrunning of the motors 130, 132.

The first ring gear clutch 110 is engaged as is schematically shown at 150 to couple power from the first tower shaft 76 to the ring gear 108. The second ring gear clutch 112 will free wheel and allow rotation of the ring gear 108. The second tower shaft 78 will drive the sun gear 102 and thereby the gear 126 and the carrier 106. The carrier 106 will in turn drive the first gear system 122, within the accessory gearbox 68. Power from each of the high spool 32 and the low spool 30 will be split to drive the carrier 106 and power the accessory group schematically indicated at 144. The accessory group 144 includes accessory components 72, 74, 75 and 80.

The accessory group 142 includes auxiliary oil pump 82 driven by the gear coupling 124 to the ring gear shaft 92. The accessory group 140 includes the fuel pump 74 driven by the gear coupling 126 to the sun gear shaft 100. Each of the ring gear shaft 92, sun gear shaft 100 and carrier 106 rotate at different speeds and therefore the accessory components 72, 74, 75, 80 and 82 are driven by the corresponding one of the ring gear shaft 92, sun gear shaft 100 and carrier 106 that best corresponds with a desired speed and operation of each accessory component.

In the disclosed example embodiment, the fuel pump 74 is driven by the sun gear shaft 100 that is in turn driven by the high speed spool 32. Fuel flow requirements are tied closely to the speed of the high speed spool 32. Coupling the fuel pump 74 to the sun gear shaft 100 enables driving of the fuel pump 74 by only the high speed spool 32 at a speed that corresponds and changes proportionally with operation of the engine 20 to provide a more desirable corresponding variation in operation. Moreover, the gear coupling 126 can be set to generate the desired proportional speed of the fuel pump in direct relationship to the speed of the high speed spool 32.

The accessory group 144 including the main oil pump 80, generator 72 and hydraulic pump 75 all demand significant power without a strong tie or correlation to a speed of either of the spools 30, 32. Accordingly, the accessory group 144 is driven through a coupling to the carrier 106. The carrier 106 is driven by power extracted from both spools 30, 32 to provide a steady consistent power output.

The accessory group 142 in this example includes the auxiliary oil pump 82 driven through the gear coupling 128 by the ring gear shaft 92. The ring gear shaft 92 is coupled to the low speed spool 30. The auxiliary oil pump 82 is desired to operate during low and negative G environments as well as operate when the engine is not operating but the fan is rotating to drive the low speed spool 30. In configurations where the accessory components are driven only by the high speed spool 32, the auxiliary oil pump 82 is not engaged and therefore does not produce an output flow of oil 68. However, the third output from the superposition gear system 66 enables direct driving by the low speed spool 30 as needed to provide the desired operation. The gear couplings driving each of the accessory groups 140, 142, and 144 are each defined in consideration of the accessory component driven and are tailored to provide the most efficient speeds for each accessory component 72, 74, 75, 80 and 82.

It should be understood that although disclosed groups of accessory components are driven by specific gear couplings to specific locations and features of the superposition gear system 66, each accessory component could be configured to be driven by gear couplings in combinations that differ from the disclosed examples. Each accessory component could be driven by any of the outputs provided by the superposition gear system 66. Moreover, not all the outputs need to drive an accessory component to be considered within the contemplation of this disclosure. Any configuration of the example superposition gear system 66 will be determined by the design and operational requirements for each accessory.

Figure 6:
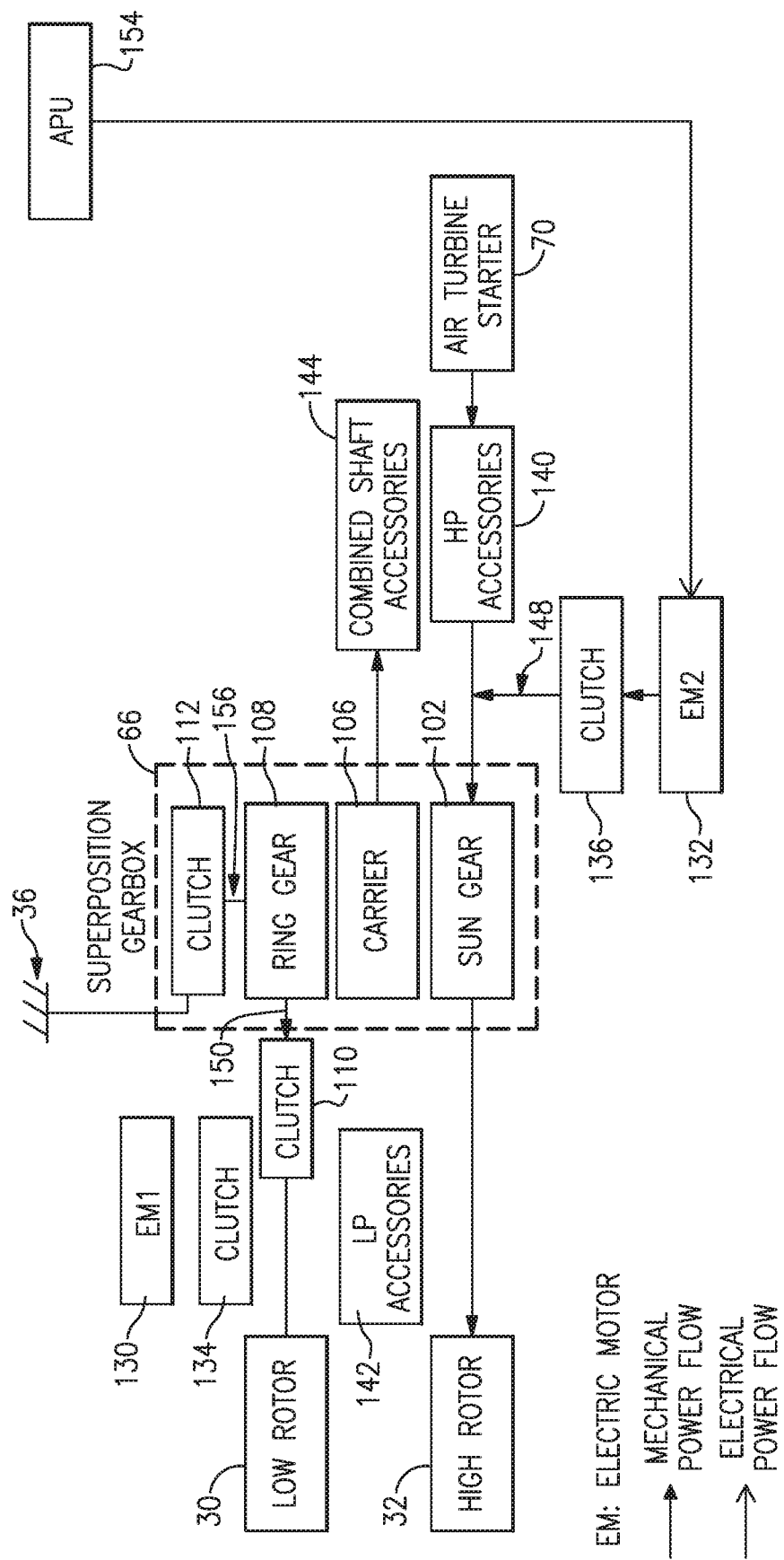
FIG. 6 is a schematic view of the example dual spool power extraction gearbox configured to start the engine.

Referring to FIG. 6 with continued reference to FIG. 2, the mechanical and electrical power flow during a starting operation is schematically shown. During the starting operation, the starter 70 drives the sun gear shaft 100 in a first direction. The starter clutch 75 engages to enable driving of the sun gear shaft 100 by the starter 70. The same rotation provided by the starter 70 will engage the ring gear 108 such that the second ring gear clutch 112 is engaged as is schematically shown at 156 to lock the ring gear 108 to the static structure 36 to prevent rotation of the ring gear 108. The first ring gear clutch 110 is not locked in this direction, but does not receive a driving input and therefore does not rotate the corresponding first tower shaft 76.

The second electric motor 132 is engaged to aid in the starting operation. The second motor clutch 136 engages the sun gear shaft 100 as is schematically shown at 148. The additional power provided by the second electric motor 132 enables the starter 70 to be of a reduced power capacity. Moreover, the electric motor 132 may also operate as a backup to the starter 70 to provide an aided redundancy for non-standard starting operations.

Once the engine has started and the high speed spool 32 is rotating at speed, the starter 70 and the electric motor 132 are disengaged. The high speed spool 32 will begin driving the second tower shaft 78 and thereby the sun gear shaft 100. The higher speed provided by the driving of the high speed spool 32 disengages the starter 70 and second electric motor 132. Additionally, once the low speed spool 30 begins operation, the first tower shaft 76 will begin rotating. The first ring gear clutch 110 will engage to couple the ring gear shaft 92 to the ring gear 108. In this operating condition, both the low speed spool 30 and the high speed spool 32 will drive portions of the superposition gear system 66.

According, the example accessory drive system 62 includes the superposition gear system 66 that automatically distributes input driving torque between the low speed spool 30, the high speed spool 32 as required during engine operation. The drive system 62 further includes first and second electric motors that selectively couple to the superposition gear system 66 to supplement power from the spools 30, 32.

Although an example embodiment has been disclosed, a worker of ordinary skill in this art would recognize that this disclosure is not just a material specification and that certain modifications would come within the scope of this disclo-

What is claimed is:

1. A turbofan engine comprising:
a first spool including a first turbine;
a second spool including a second turbine disposed axially forward of the first turbine;
a first tower shaft engaged to the first spool;
a second tower shaft engaged to the second spool;
an accessory gearbox supporting a plurality of accessory components;
a superposition gear system disposed within the accessory gearbox, the superposition gear system including, a plurality of intermediate gears engaged to the sun gear and supported in a carrier and a ring gear circumscribing the intermediate gears, wherein the second tower shaft is engaged to drive the sun gear;
a starter selectively coupled to the sun gear through a starter clutch;
a first electric motor selectively coupled to the ring gear through a first motor clutch,
a second electric motor selectively coupled to the sun gear through a second motor clutch, wherein the first electric motor and the second electric motor are operable to input power into a corresponding one of the first and second spools.

2. The turbofan engine as recited in claim 1, including an electric power supply providing power to the first electric motor and the second electric motor.

3. The turbofan engine as recited in claim 1, including a first ring gear clutch for selectively coupling the first tower shaft to the ring gear and a second ring gear clutch for selectively coupling the ring gear to a static structure of the engine.

4. The turbofan engine as recited in claim 3, wherein a carrier shaft is coupled to drive a first gear system within the accessory gearbox for driving a first group of the plurality of accessory components.

5. The turbofan engine as recited in claim 4, including a sun gear shaft supporting the sun gear, the sun gear shaft coupling the second tower shaft to the starter through the starter clutch.

6. The turbofan engine as recited in claim 5, including a ring gear shaft driven by the first tower shaft, wherein the ring gear is coupled to drive a second group of the plurality of accessory components.

7. The turbofan engine as recited in claim 6, including a drive gear coupled to the sun gear shaft to drive a third group of the plurality of accessory components.

8. The turbofan engine as recited in claim 1, wherein the first turbine comprises a low pressure turbine and the second turbine comprises a high pressure turbine.

9. The turbofan engine as recited in claim 1, wherein the first tower shaft and the second tower shaft are concentric about a common axis.

10. The turbofan engine as recited in claim 1, wherein the first tower shaft and the second tower shaft are disposed about different axes.

11. The turbofan engine as recited in claim 3, wherein the starter clutch, first motor clutch, second motor clutch, first ring gear clutch and the second ring gear clutch comprise one-way mechanical clutches.

12. The turbofan engine as recited in claim 1, wherein the first motor clutch couples the first electric motor to the first tower shaft to drive the first spool and the second motor clutch couples the second electric motor to the second tower shaft to drive the second spool in an engine idle operating condition.

13. The turbofan engine as recited in claim 12, wherein the first motor clutch and the second motor clutch are not coupled during a normal operating condition such that neither the first electric motor nor the second electric motor input power to either of the first spool and the second spool.

14. The turbofan engine as recited in claim 13, wherein the second clutch couples the second electric motor to the second tower shaft to drive the second spool in an engine starting operating condition.

15. An accessory gearbox for a turbofan engine, the accessory gearbox comprising:
a superposition gear system including a sun gear coupled to a second tower shaft of the turbofan engine;
a plurality of intermediate gears engaged to the sun gear and supported in a carrier;
a ring gear circumscribing the intermediate gears and coupled to a first tower shaft;
a starter selectively coupled to the sun gear through a starter clutch;
a first output coupled to the carrier shaft for driving a first group of accessory components;
a second output coupled to the first tower shaft for driving a second group of accessory components;
a first motor means coupled to the ring gear;
a second motor means coupled to the sun gear, wherein the first motor means and the second motor means are operable to input power into a corresponding one of the first and second tower shafts.

16. The accessory gearbox as recited in claim 15, wherein the first output comprises a carrier shaft attached to the carrier that is coupled to a first gear system driving the first group of accessory components.

17. The accessory gearbox as recited in claim 16, wherein the second output comprises a ring gear shaft driven by the first tower shaft that is coupled to a second gear system for driving the second group of accessory components.

18. The accessory gearbox as recited in claim 15, wherein each of the first motor means and second motor means comprise electric motors that are powered by an electric power supply.

19. The accessory gearbox as recited in claim 18, wherein a first motor clutch couples the first electric motor to the first tower shaft to drive a first spool and a second motor clutch couples the second electric motor to drive the second tower shaft in an engine idle operating condition.

20. The accessory gearbox as recited in claim 19, wherein the second clutch couples the second electric motor to the second tower shaft to drive a second spool in an engine starting operating condition.

21. The accessory gearbox as recited in claim 15, wherein the each of the first motor means and second motor means comprise electric motor/generators that are powered by an electric power supply.

22. A method of operating an accessory gearbox for a turbofan engine comprising:
coupling a first tower shaft to engage a first spool;
coupling a second tower shaft to engage a second spool;
coupling a sun gear of a superposition gear system supported within the accessory gearbox to the second tower shaft, wherein the superposition gear system includes the sun gear, a plurality of intermediate gears engaged to the sun gear and supported in a carrier and a ring gear circumscribing the intermediate gears;

coupling a first electric motor to the first tower shaft to input power to the first spool; and coupling a second electric motor to the second tower shaft to input power to the second spool during an engine idle operating condition.

23. The method as recited in claim 22, including coupling a starter to the sun gear, coupling the ring gear to an engine static structure, coupling the second electric motor to the second tower shaft and driving the second spool with the starter and the second electric motor to rotate the second spool and start the turbofan engine.

24. The method as recited in claim 23, including decoupling each of the first electric motor and the second electric motor such that neither the first electric motor nor the second electric motor input power to either of the first spool and the second spool and the first tower shaft drives the ring gear and the second tower shaft drives the sun gear once both the first spool and the second spool are rotating independent of rotation of the starter such that both the first tower shaft and the second tower shaft combine to drive a first output coupled to the carrier and a second output coupled to the ring gear.

25. The method as recited in claim 22, wherein a first output of the superposition gear system drives a first group of accessory components at a first speed and a second output of the superposition gear system drives a second group of accessory components at a second speed different than the first speed.

26. The method as recited in claim 25, wherein a third output coupled to sun gear drives a third group of accessory components at a third speed that is different that both the first speed and the second speed.

\* \* \* \* \*